United States Patent [19]
Jani et al.

[11] Patent Number: 5,610,933
[45] Date of Patent: Mar. 11, 1997

[54] FLASHLAMP-PUMPED HO:TM:CR:LUAG LASER

[76] Inventors: Mahendra G. Jani, 7050 E. Sunrise Dr., Apt. 1202, Tucson, Ariz. 85750; Norman P. Barnes, 103 Stone Lake Ct., Yorketown, Va. 23693; Keith E. Murray, P.O. Box 438, White Marsh, Va. 23183; Milan R. Kokta, 1906 SE. 331st Ave., Washougal, Wash. 98671

[21] Appl. No.: 592,791

[22] Filed: Jan. 29, 1996

[51] Int. Cl.$^6$ ........................................ H01S 3/16
[52] U.S. Cl. ................................. 372/41; 372/13
[58] Field of Search ................. 372/39, 41, 69, 372/70, 10, 13

[56] References Cited

U.S. PATENT DOCUMENTS 5,088,103  2/1992  Esterowitz et al. .

OTHER PUBLICATIONS

Rodriquez et al; "Quasi–Two–Level Laser Operation of Tm:LuAg"; in Conference on Laser and Electro–Optics; vol. 8; pp. 174–175;1994.

A. A. Kaminskii et al., "Investigation of Stimulated Emission From $Lu_3Al_5O_{12}$ Crystal With $Ho^{3+}$, $Er^{3+}$, and $Tm^{3+}$ Ions", *Phys. Status Soledi* 18a, (1973), pp. K–31–K33.

*Primary Examiner*—Leon Scott, Jr.
*Attorney, Agent, or Firm*—Peter J. Van Bergen

[57] ABSTRACT

A room temperature solid-state laser is provided. A laser crystal is disposed in a laser cavity. The laser crystal has a LuAG host material doped with a concentration of about 0.35% Ho ions, about 5.57% Tm ions and at least about 1.01% Cr ions. A broadband energizing source such as a flashlamp is disposed transversely to the laser crystal to energize the Ho ions, Tm ions and Cr ions.

8 Claims, 3 Drawing Sheets

FLASHLAMP-PUMPED HO:TM:CR:LUAG LASER

STATEMENT OF GOVERNMENT INTEREST

This invention was made with Government support under contract NAS1-19603 awarded by NASA. The Government has certain rights in this invention.

CROSS-REFERENCE TO RELATED PATENT APPLICATIONS

This patent application is related to co-pending patent application entitled "QUASI FOUR-LEVEL Tm:LuAGLASER", Ser. No. 08/593,438, filed on Jan. 28, 1986.

FIELD OF THE INVENTION

The invention relates generally to lasers, and more particularly to quasi four-level lasers operating at room temperature in the 2 µm wavelength region.

BACKGROUND OF THE INVENTION

Quasi four-level solid-state lasers operating in the 2 µm wavelength region are used for sensing wind velocity, as optical pumps for mid-infrared parametric oscillators, for remote sensing of water vapor or carbon dioxide, for medical applications such as laser angioplasty, for material processing applications, and for communications.

In general, quasi four-level lasers operating in the 2 µm wavelength region utilize laser material made from a host material doped with laser active ions from the group of rare earth ions such as holmium (Ho) and thulium (Tm), transition metal ions such as chromium (Cr) or combinations thereof. The host materials for such lasers come from the group of crystals such as YAG, YLF, YSGG, GSGG, GSAG, YSAG, YAlO, GGG, YGG and LLGG. As is known in the art, the Ho:Tm:Cr:YAG laser has provided the best performance for flashlamp-pumped, quasi four-level lasers operating at room temperature. However, Ho:Tm:Cr:YAG laser has a high threshold and further suffers from upconversion losses. While performance improvements can be achieved by lowering the laser's operating temperature, the addition of cooling devices adds to the complexity and cost of the laser.

SUMMARY OF THE INVENTION

Accordingly, it is an object of the present invention to provide a quasi four-level laser that operates at room temperature and has a reduced threshold for laser action.

Another object of the present invention is to provide a quasi four-level laser that operates at room temperature and decreases upconversion losses.

Other objects and advantages of the present invention will become more obvious hereinafter in the specification and drawings.

In accordance with the present invention, a solid-state laser has a laser cavity defined by reflective elements aligned on a common axis to form a reflective path therebetween. A laser crystal is disposed in the laser cavity along the common axis. The laser crystal has a LuAG host material doped with a concentration of about 0.35% Ho ions, about 5.57% Tm ions and at least about 1.01% Cr ions. A broadband energizing source such as a flashlamp is disposed transversely to the laser crystal to energize the Ho ions, Tm ions and Cr ions. In operation at room temperature in both the normal and Q-switched modes, the laser achieves improved performance, reduced threshold and reduced upconversion losses in comparison to the Ho:Tm:Cr:YAG laser.

DETAILED DESCRIPTION OF THE INVENTION

Figure 1:
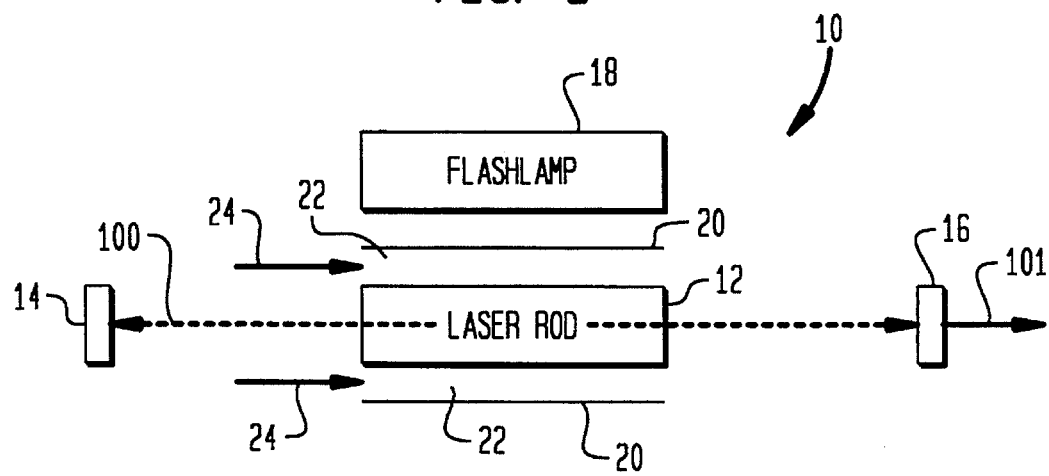
FIG. 1 is a schematic of the flashlamp-pumped Ho:Tm:Cr:LuAG laser according to the present invention.

Referring now to the drawings, and more particularly to FIG. 1, a flashlamp-pumped laser is shown schematically and referenced generally by numeral 10. Laser 10 includes a laser crystal or rod 12 disposed along the reflective path axis of a laser cavity defined by reflective elements or mirrors 14 and 16. The reflective path axis of laser 10 is referenced in FIG. 1 by dashed arrowed line 100. Accordingly, mirrors 14 and 16 form a resonator. To create laser emission, one of mirrors 14 and 16 is substantially or completely reflective while the other must be partially transmissive at the lasing wavelength of laser rod 12. For purpose of this description it will be assumed that mirror 14 is the completely reflective element and mirror 16 is partially transmissive so that laser light at the selected wavelength is emitted. The emitted laser light of laser 10 is referenced in FIG. 1 by arrow 101. To excite laser rod 12 into laser emission, an excitation source is provided near laser rod 12. For purpose of the present invention, the excitation source is a broadband excitation source such as a flashlamp 18 that is positioned transversely to laser rod 12.

Cooling means are generally provided to cool laser rod 12 during operation of laser 10. For example, a glass sleeve or jacket 20 can encase laser rod 12 such that a gap 22 is formed about laser rod 12. A coolant, represented by arrows 24, is pumped through gap 22 and contacts laser rod 12. In terms of the present invention, laser rod 12 need only be maintained at room temperature between about 15° C. and about 21° C. Accordingly, coolant 24 can simply be maintained at room temperature as it flow around laser rod 12.

Laser rod 12 is a crystal laser material having a host material of lutetium aluminum garnet (LuAG) that is doped with holmium (Ho) ions, thulium (Tm) ions and chromium (Cr) ions. More specifically, the LuAG host material in laser rod 12 of the present invention is doped with concentrations of about 0.35% Ho ions, about 5.57% Tm ions and at least about 1.01% Cr ions. The percent concentrations are defined herein as the percent of the particular doping ions that are measured as being present in the laser material. Measurement of such concentrations can be accomplished spectrophotometrically as is known in the art.

To illustrate the advantages of the present invention, a Ho:Tm:Cr:LuAG laser rod was fabricated and tested in comparison with a Ho:Tm:Cr:YAG laser rod in the same laser set-up. The percent concentrations for the Ho:Tm:Cr:YAG material were 0.36% Ho ions, 6% Tm ions and 0.85% Cr ions to yield the same number density of Ho and Tm ions in both materials. Both laser materials were fabricated into 5.0 mm diameter laser rods. The length of the laser rods were 86 mm for LuAG and 85 mm for YAG. Since the pumped length of the laser rod in the commercially available laser cavity is only 75 mm, the slightly shorter YAG laser rod probably has a small advantage. Each of the laser rods was housed in a $BaSO_4$ diffusely reflecting cavity which was flooded with coolant water maintained at 16° C. A nearly square pump pulse with a 500 μsec pulse length powered a 4.0 mm bore by 76 mm arc length flashlamp. While mirrors of various reflectivity were used for mirror 16, mirror 14 had a 2.0 m radius of curvature and was separated from mirror 16 by 0.8 m.

Figure 2:
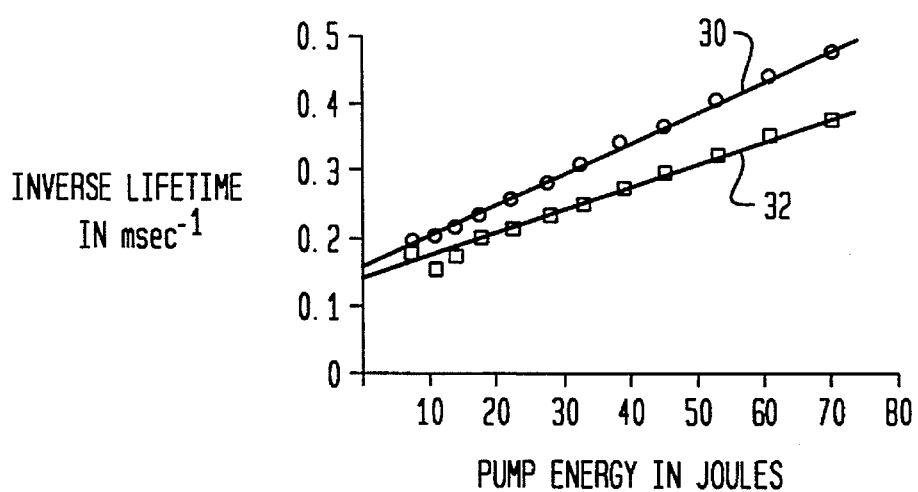
FIG. 2 is a graph comparing the inverse of the lifetime measurements of the Ho:Tm:Cr:LuAG and Ho:Tm:Cr:YAG laser materials.

Lifetime measurements of the Ho $^5I_7$ manifold (as a function of the pump energy) indicate that Ho:Tm:Cr:YAG at comparable performance levels. With the laser rods installed in the pump cavities the lifetime of the Ho $^5I_7$ manifold could be measured as a function of the pump energy. Data was taken and is shown in FIG. 2 where curve 30 represents data from Ho:Tm:Cr:YAG and curve 32 represents data from Ho:Tm:Cr:LuAG. Plotted in this graph is the inverse of the lifetime, measured from 0.9 to 0.5 of the fluorescence peak, as a function of the pump energy. The initial lifetime of Ho:Tm:Cr:LuAG is longer and the rate of decrease less than that of Ho:Tm:Cr:YAG. That is, the inverse of the lifetime increases faster for Ho:Tm:Cr:YAG than for Ho:Tm:Cr:LuAG. Longer lifetimes for the upper laser level are beneficial, especially for Q-switched operation as will be apparent later in the description. Furthermore, the lower dependence of the lifetime on the pump energy indicates less upconversion at comparable performance levels.

Figure 3:
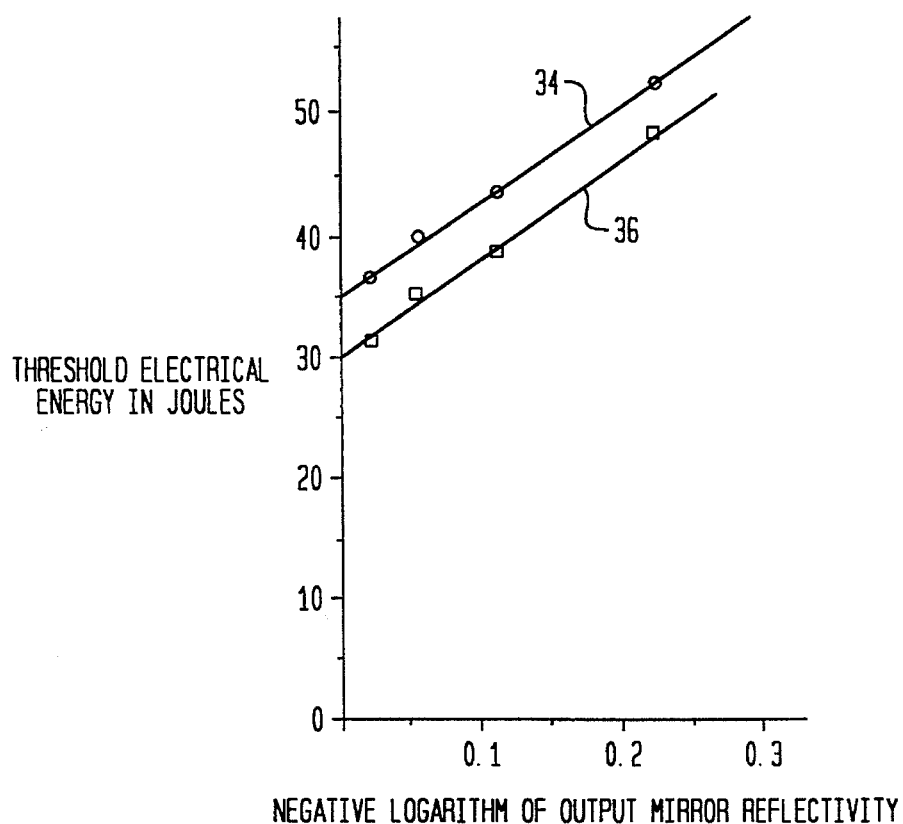
FIG. 3 is a graph comparing the required threshold energies for Ho:Tm:Cr:LuAG and Ho:Tm:Cr:YAG.
Figure 4:
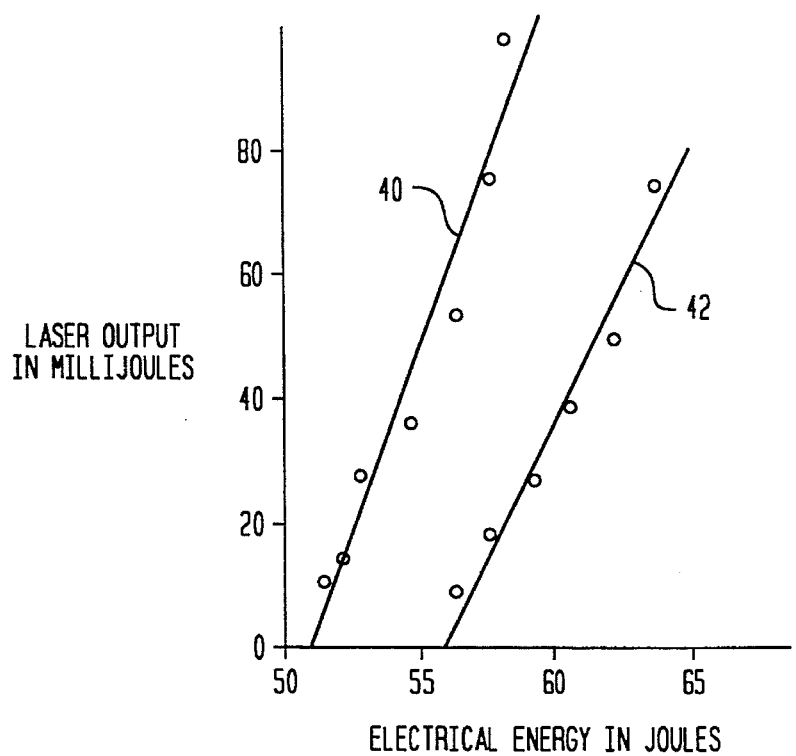
FIG. 4 is a graph comparing laser performance of the Ho:Tm:Cr:LuAG and Ho:Tm:Cr:YAG lasers operating in the normal mode.

Normal mode operation was characterized by measuring laser output energy as a function of the electrical energy and fitting the data to obtain a threshold. Data was taken for both Ho:Tm:Cr:LuAG and Ho:Tm:Cr:YAG with the resulting data curve fit to obtain the parameters. Threshold results appear in FIG. 3 as a function of the negative logarithm of the output mirror reflectivity. In FIG. 3, curve 34 represents data from Ho:Tm:Cr:YAG and curve 36 represents data from Ho:Tm:Cr:LuAG. As is readily apparent, the Ho:Tm:Cr:LuAG laser has a lower threshold than the Ho:Tm:Cr:YAG laser. As seen in FIG. 3, the threshold for the Ho:Tm:Cr:YAG laser material is about a factor of 1.17 higher than the Ho:Tm:Cr:LuAG laser material of the present invention. As the mirror reflectivity decreases, that is, the negative logarithm of the mirror reflectivity increases, threshold of both laser materials increase at nearly the same rate. A similar rate of increase is expected since the effective stimulated emission cross sections of the two laser materials are very nearly equal. In the normal mode, performance of the Ho:Tm:Cr:LuAG laser was superior to that of the Ho:Tm:Cr:YAG laser over the range of input energies as is evidenced by FIG. 4 where curve 40 represents the performance of Ho:Tm:Cr:LuAG and curve 42 represents the performance of Ho:Tm:Cr:YAG. It is also apparent from FIG. 4 that the slope efficiency of Ho:Tm:Cr:LuAG (0.117) is better than the slope efficiency of Ho:Tm:Cr:YAG (0.085).

Since both LuAG and YAG are optically isotropic materials, only a single absorption spectrum is necessary to characterize the absorption properties. Strong Cr absorption bands, centered near 0.42–0.43 and 0.59–0.60 μm can be easily identified. Absorption spectra of Ho:Tm:Cr:LuAG material described herein indicate that the initial growth of this material resulted in a laser rod where the Cr concentration of 1.01% was low. Spectroscopic samples were available from the same boules from which the laser rods were cut. Absorption spectra from the LuAG and YAG samples (both about 3.0 mm thick) were taken and corrected for Fresnel losses. By using measured absorption data, absorption efficiency calculations indicate that the Cr concentration of the YAG sample is approximately correct for optimum absorption. Thus, the performance of Ho:Tm:Cr:YAG is not expected to improve with a variation in the Cr concentration. However, similar calculations for the LuAG material indicated that the Cr concentration of 1.01% is below the optimum concentration and that the Cr concentration can be increased to about 1.5% for optimum absorption. Thus, the performance of the Ho:Tm:Cr:LuAG is expected to further improve as the Cr concentration increases from about 1.01% to about 1.5%.

Figure 5:
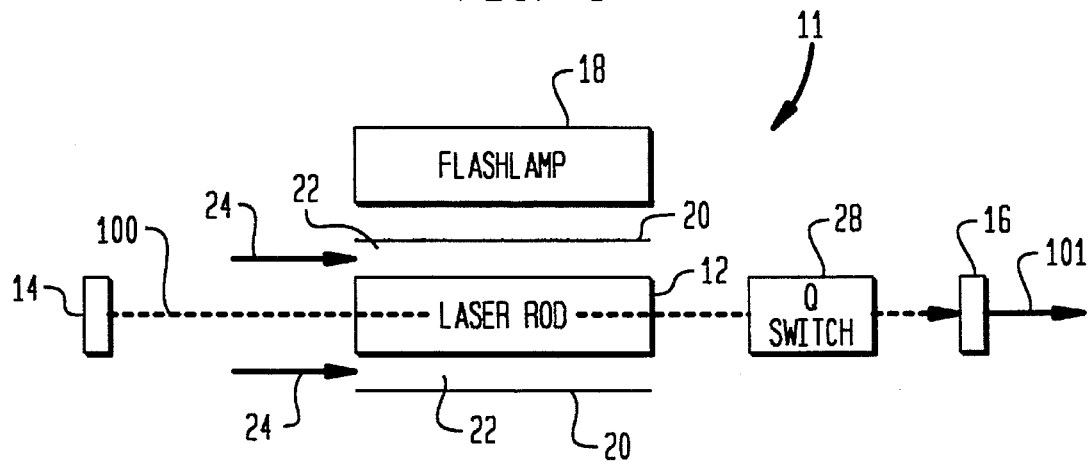
FIG. 5 is a schematic of the Ho:Tm:Cr:LuAG laser with the addition of a Q-switch to achieve giant pulse operation.
Figure 6:
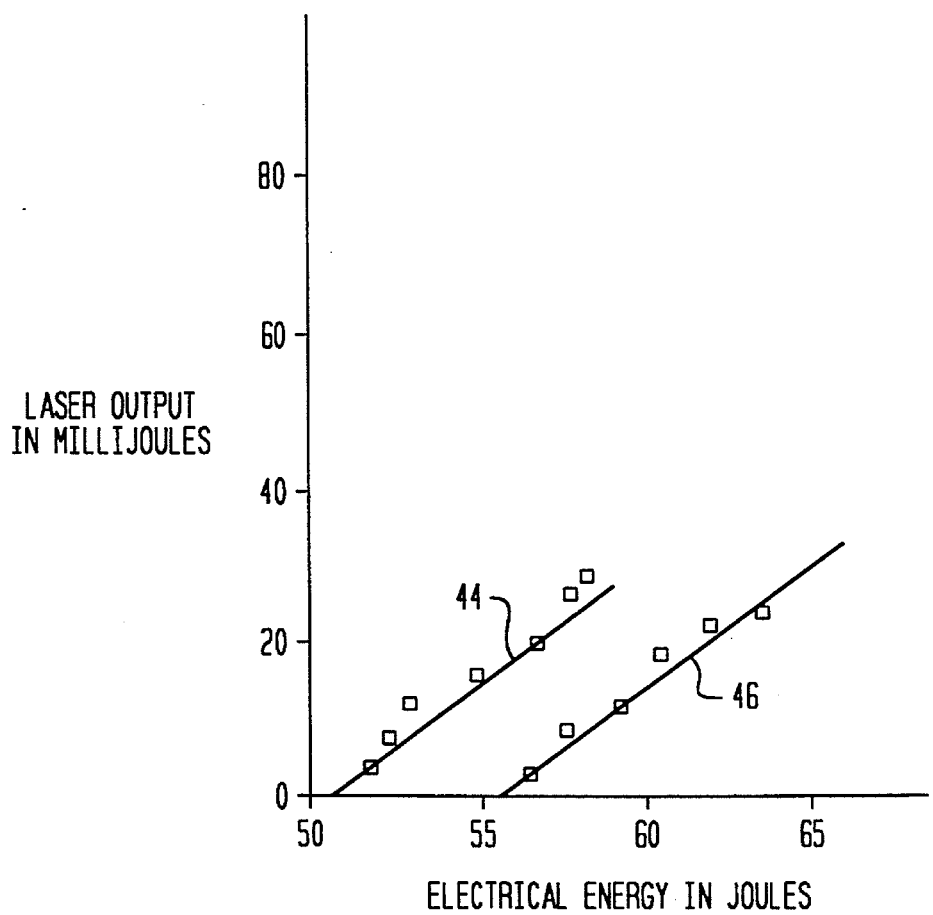
FIG. 6 is a graph comparing laser performance of the Ho:Tm:Cr:LuAG and Ho:Tm:Cr:YAG lasers operating in the Q-switched mode.

The present invention also exhibits superior performance in the Q-switched mode. In FIG. 5, laser 11 is a Q-switched laser that includes elements that are identical to laser 10 (FIG. 1) and further includes Q-switch 28 disposed in reflective path axis 100 between laser rod 12 and mirror 16. For purpose of the comparison between the above-described Ho:Tm:Cr:LuAG and Ho:Tm:Cr:YAG laser materials, Q-switch 28 was a fused silica acousto-optic Q-switch cut at a Brewster's angle. Using 75 W of radio frequency power, complete extinction was obtained. Q-switching was limited to a single pulse output for all of the experiments by turning the radio frequency power off only long enough for a single pulse to occur. Before re-pumping of the Ho $^5I_8$ manifold could occur, the radio frequency power was turned on again. Typically the Q-switch was turned off for approximately 10 μsec to achieve single pulse operation. As is evidenced from the graph of FIG. 6, Q-switched performance of Ho:Tm:Cr:LuAG exceeded that of Ho:Tm:Cr:YAG where curve 44 represents the performance of Ho:Tm:Cr:LuAG and curve 46 represents the performance of Ho:Tm:Cr:YAG. In addition, under Q-switched operation, the threshold of Ho:Tm:Cr:LuAG is lower and the slope efficiency is slightly higher than the corresponding parameters for Ho:Tm:Cr:YAG. More specifically, Ho:Tm:Cr:LuAG had a threshold of 50.4 J versus 55.4 J for Ho:Tm:Cr:YAG, and Ho:Tm:Cr:LuAG had a slope efficiency of 0.0034 versus 0.0032 for Ho:Tm:Cr:YAG.

The advantages of the present invention are numerous. The flashlamp-pumped Ho:Tm:Cr:LuAG laser operates at a low threshold thereby reducing undesirable thermal effects brought on by higher input energies. The Ho:Tm:Cr:LuAG laser material had decreased upconversion losses when compared with the conventional Ho:Tm:Cr:YAG laser material. Performance of the Ho:Tm:Cr:LuAG laser surpassed that of the Ho:Tm:Cr:YAG laser for both the normal and Q-switched modes. Furthermore, all of the improvements are achieved while operating the laser at room temperature.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A solid-state laser, comprising:
   a laser cavity defined by reflective elements aligned on a common axis to form a reflective path therebetween;
   a laser crystal disposed in said laser cavity along said common axis, said laser crystal having a LuAG host material doped with a concentration of about 0.35% Ho ions, about 5.57% Tm ions, and between about 1.01% and about 1.5% Cr ions; and
   a broadband energizing source disposed transversely to said laser crystal for energizing said Ho ions, said Tm ions and said Cr ions.

2. A solid-state laser as in claim 1 wherein said broadband energizing source is a flashlamp.

3. A solid-state laser as in claim 1 further comprising a Q-switch disposed in said reflective path.

4. A solid-state laser as in claim 3 wherein said Q-switch is a fused silica acousto-optic Q-switch.

5. A solid-state laser as in claim 1 further comprising means for maintaining said laser crystal at room temperature.

6. A solid-state laser, comprising:
   a laser cavity defined by a first reflective element that is completely reflective and a second reflective element that is partially transmissive, said first reflective element and said second reflective element being aligned on a common axis to form a reflective path therebetween;
   a laser crystal disposed in said laser cavity along said common axis, said laser crystal having a LuAG host material doped with a concentration of about 0.35% Ho ions, about 5.57% Tm ions, and between about 1.01% and about 1.5% Cr ions;
   a Q-switch disposed in said reflective path between said laser crystal and said second reflective element; and
   a flashlamp source disposed transversely to said laser crystal for energizing said Ho ions, said Tm ions and said Cr ions.

7. A solid-state laser as in claim 6 wherein said Q-switch is a fused silica acousto-optic Q-switch.

8. A solid-state laser as in claim 6 further comprising means for maintaining said laser crystal at room temperature.

\* \* \* \* \*